United States Patent
Godfrey et al.

(10) Patent No.: US 8,036,218 B2
(45) Date of Patent: *Oct. 11, 2011

(54) TECHNIQUE FOR ACHIEVING CONNECTIVITY BETWEEN TELECOMMUNICATION STATIONS

(75) Inventors: Timothy Gordon Godfrey, Overland Park, KS (US); Michael Andrew Fischer, San Antonio, TX (US)

(73) Assignee: Intellectual Ventures I LLC, Wilmington, DE (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/172,765

(22) Filed: Jul. 14, 2008

(65) Prior Publication Data
US 2009/0141693 A1  Jun. 4, 2009

Related U.S. Application Data

(63) Continuation of application No. 10/617,324, filed on Jul. 10, 2003, now Pat. No. 7,400,621.

(60) Provisional application No. 60/453,612, filed on Mar. 11, 2003.

(51) Int. Cl.
*H04L 12/28* (2006.01)
(52) U.S. Cl. ........ 370/389; 370/392; 370/475; 370/328; 370/338; 455/426.2
(58) Field of Classification Search ............ 370/389
See application file for complete search history.

(56) References Cited

U.S. PATENT DOCUMENTS

| | | | |
|---|---|---|---|
| 7,330,456 B2 * | 2/2008 | Yeh | 370/338 |
| 7,376,091 B1 * | 5/2008 | Eccles et al. | 370/265 |
| 7,400,621 B2 | 7/2008 | Godfrey et al. | |
| 2003/0054818 A1 * | 3/2003 | Bahl et al. | 455/432 |
| 2003/0064752 A1 * | 4/2003 | Adachi et al. | 455/560 |
| 2003/0156558 A1 | 8/2003 | Cromer et al. | |
| 2003/0172142 A1 * | 9/2003 | Su | 709/223 |
| 2003/0210700 A1 | 11/2003 | Chen | |
| 2003/0220988 A1 | 11/2003 | Hymel | |
| 2005/0135305 A1 | 6/2005 | Wentink | |
| 2006/0062187 A1 | 3/2006 | Rune | |
| 2006/0148516 A1 | 7/2006 | Reddy et al. | |

FOREIGN PATENT DOCUMENTS

| | | |
|---|---|---|
| GB | 2379124 | 2/2003 |
| WO | 2004/082194 | 9/2004 |

OTHER PUBLICATIONS

Intel: "Intel NetStructure 470 Switches: setting up priority tagging" 'Online! Jan. 11, 2003 Retrieved from the Internet: URL:http://web.archive.org/web/20030111235136/http://support.intel.com/support/netstructure/switches/470/31247.htm> retrieved on Sep. 3, 2004! paragraph 0001-paragraph 0003!

(Continued)

*Primary Examiner* — Rafael Pérez-Gutiérrez
*Assistant Examiner* — German Viana Di Prisco

(57) ABSTRACT

A technique for enabling a secure, point-to-point wireless connection between a secondary computer (e.g., a personal digital assistant, etc.) and a primary computer (e.g., a notebook, a desktop, etc.) is disclosed. The primary computer is associated with an extended infrastructure through an access point. The present invention enables the secondary computer to communicate either with the associated primary computer or with an extended network indirectly through the access point.

23 Claims, 7 Drawing Sheets

OTHER PUBLICATIONS

Dell: "Wireless Security in 802.11 (Wi-Fi) networks" 'Online! Jan. 2000, Retrieved from the Internet: URL:http://www.dell.com/downloads/global/vectors/wireless_security.pdf>.

Bowman, Barb, Making the Wireless Home Network Connection Windows XP Without a Router, Apr. 8, 2002.

Microsoft Windows 98 README for Browser Connection Setup Wizard, Mar. 1999.

ANSI/IEEE 802.11 Standard, 1999 Edition (pp. iv and 21).

Frodigh et al., "Wireless ad hoc Networking—The Art of Networking Without a Network," Ericsson Review No. 4, pp. 248-255 (2000).

International Preliminary Report on Patentability for PCT/US2004/007253, issued Sep. 16, 2005.

International Search Report and Written Opinion for PCT/US2004/007253, mailed Sep. 17, 2004.

\* cited by examiner

TECHNIQUE FOR ACHIEVING CONNECTIVITY BETWEEN TELECOMMUNICATION STATIONS

CROSS-REFERENCE TO RELATED APPLICATIONS

This application is a continuation of U.S. patent application Ser. No. 10/617,324, entitled "Technique for Achieving Connectivity between Telecommunication Stations," filed on Jul. 10, 2003, which is incorporated by reference and claims the benefit of U.S. Provisional Pat. Application Ser. No. 60/453,612, entitled "Technique for Achieving Connectivity between Communication Stations," filed on Mar. 11, 2003, which is also incorporated by reference.

FIELD OF THE INVENTION

The present invention relates to telecommunications in general, and, more particularly, to LANs (Local Area Networks).

BACKGROUND OF THE INVENTION

FIG. 1 depicts a schematic diagram of wireless local area network 100 in the prior art. Wireless local area network 100 comprises access point 101, telecommunication stations (i.e., "stations") 102-1 through 102-K, wherein K is a positive integer, and stations 103-1 through 103-L, wherein L is a positive integer. Stations 102-1 through 102-K and stations 103-1 through 103-L are typically used by host computers to allow communications between host computers or between host computers and other systems (e.g., printer servers, email servers, file servers, etc.). Wireless local area network 100 operates in accordance with the IEEE 802.11 set of protocols.

Together, stations 102-1 through 102-K and access point 101 form an "infrastructure network." Stations 102-1 through 102-K communicate with access point 101 while in what is called an "infrastructure mode." In fact, while operating in infrastructure mode, stations 102-1 through 102-K can communicate with each other only through access point 101. Access point 101 essentially acts as a communications coordinator for stations 102-1 through 102-K. Furthermore, access point 101 acts as a bridge to an extended infrastructure other than wireless local area network 100 for stations 102-1 through 102-K.

Stations 103-1 through 103-L communicate directly with each other and do not communicate with access point 101. They form what is called an "independent network."

SUMMARY OF THE INVENTION

Wireless local area networking capability (e.g., IEEE 802.11, etc.) is being built into personal digital assistant (PDA) products. This introduces a new user scenario, wherein the user already has a primary computer (e.g., notebook, a desktop, etc.) with, for example, IEEE 802.11 wireless local area networking capability. In this user scenario, the user wishes to connect to a secondary computer (i.e., the personal digital assistant, or equivalent), in addition to an extended infrastructure through one or more access points.

The normal infrastructure network connection scenario supported by IEEE 802.11, as well as other protocols, is that all stations associate with access points. A user adding a station (e.g., one built into the personal digital assistant, etc.) to a wireless network would have to configure the station to connect to an access point, regardless of the station's size, function relative to other stations, power output, etc. This has at least two drawbacks:

1. The access point is typically located at a distance. If the station needs to communicate with the access point directly, it will require more power, which can be prohibitive for low-power units, such as personal digital assistants.

2. Wireless connections to access points are increasingly becoming implemented with security mechanisms that are often tied to the network authentication of a user's primary computer. Extending these security and authentication mechanisms to the secondary computer adds to cost, complexity, and increases the burden of information technology (IT) management.

The present invention enables a secure, point-to-point wireless connection between a secondary computer (e.g., a PDA, etc.) and a primary computer (e.g., a notebook, a desktop, etc.), wherein the primary computer is associated with a wireless infrastructure that, in turn, possibly constitutes a larger, extended network. The present invention enables a secondary computer to communicate either with the associated primary computer or with an extended network indirectly through an access point.

The secondary computer gets a private internet protocol address from the primary computer, rather than from the overall network infrastructure. This simplifies network administration and enables use of the secondary computer in situations where the internet protocol addresses are limited or statically assigned. In addition, address management and routing performed at the primary computer enables the connection of the secondary computer to the primary computer in situations where use of internet protocol addresses is tied to billing (e.g., access in a hotel or airport, etc.), without incurring an additional charge for using the secondary computer.

All traffic from the secondary computer is seen by the extended network as originating from the primary computer. This enables the security and authentication mechanisms of the primary computer to extend to include the secondary computer, without having to implement all the security and authentication mechanisms on the secondary computer.

An illustrative embodiment of the present invention comprises: receiving a first frame from a shared-communications channel wherein the first frame comprises: (1) a first basic service set identifier; (2) a first internet protocol address; and (3) a second internet protocol address; passing the first frame based on the first basic service set identifier; tagging the first frame with a tag that represents the first basic service set identifier; and transmitting a second frame into the shared-communications channel wherein the second frame comprises: (1) a second basic service set identifier that is different from the first basic service set identifier; (2) a third internet protocol address that is different from the first internet protocol address; and (3) the second internet protocol address.

DETAILED DESCRIPTION

Figure 1:
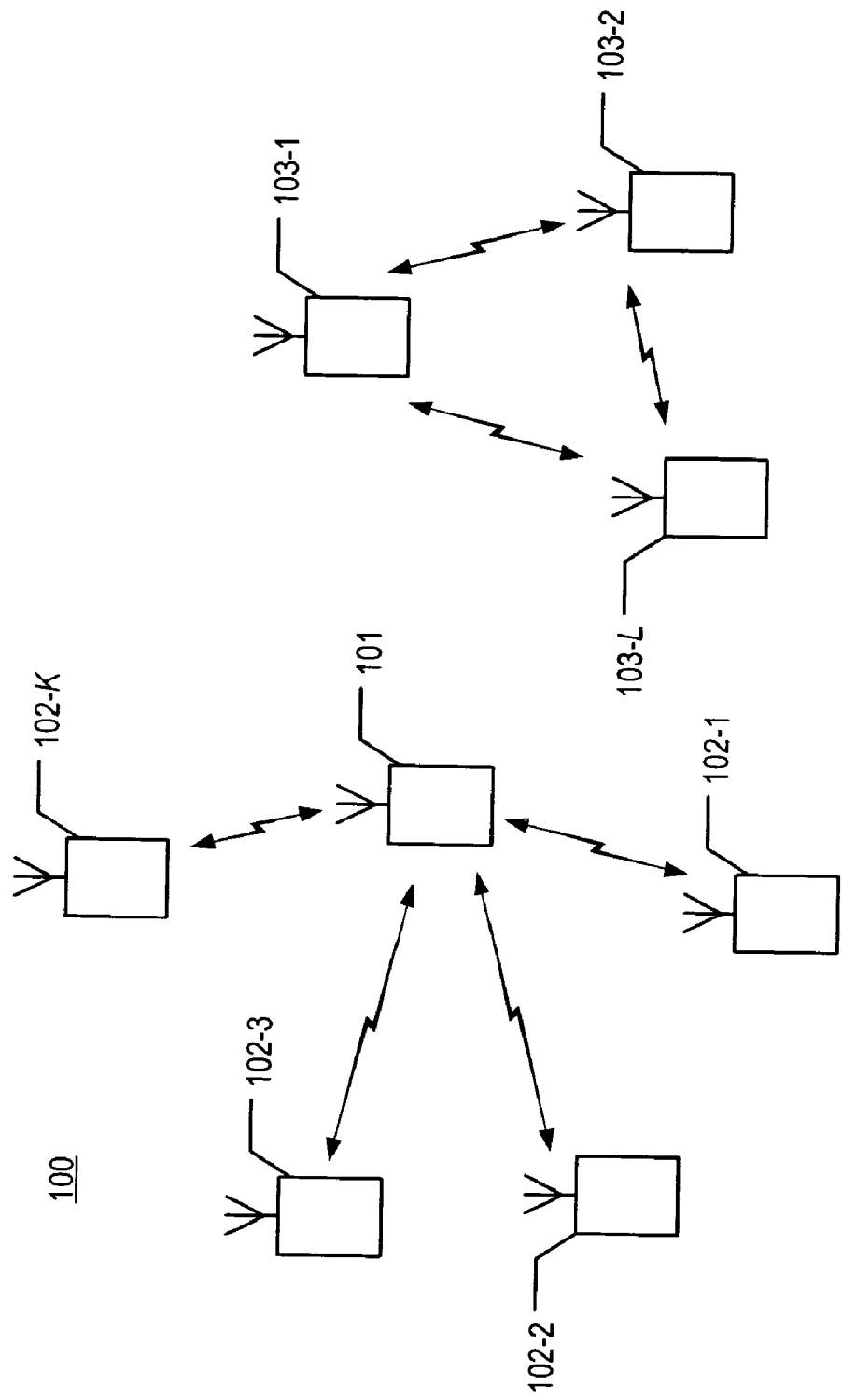
FIG. 1 depicts a schematic diagram of wireless local area network 100 in the prior art.
Figure 2:
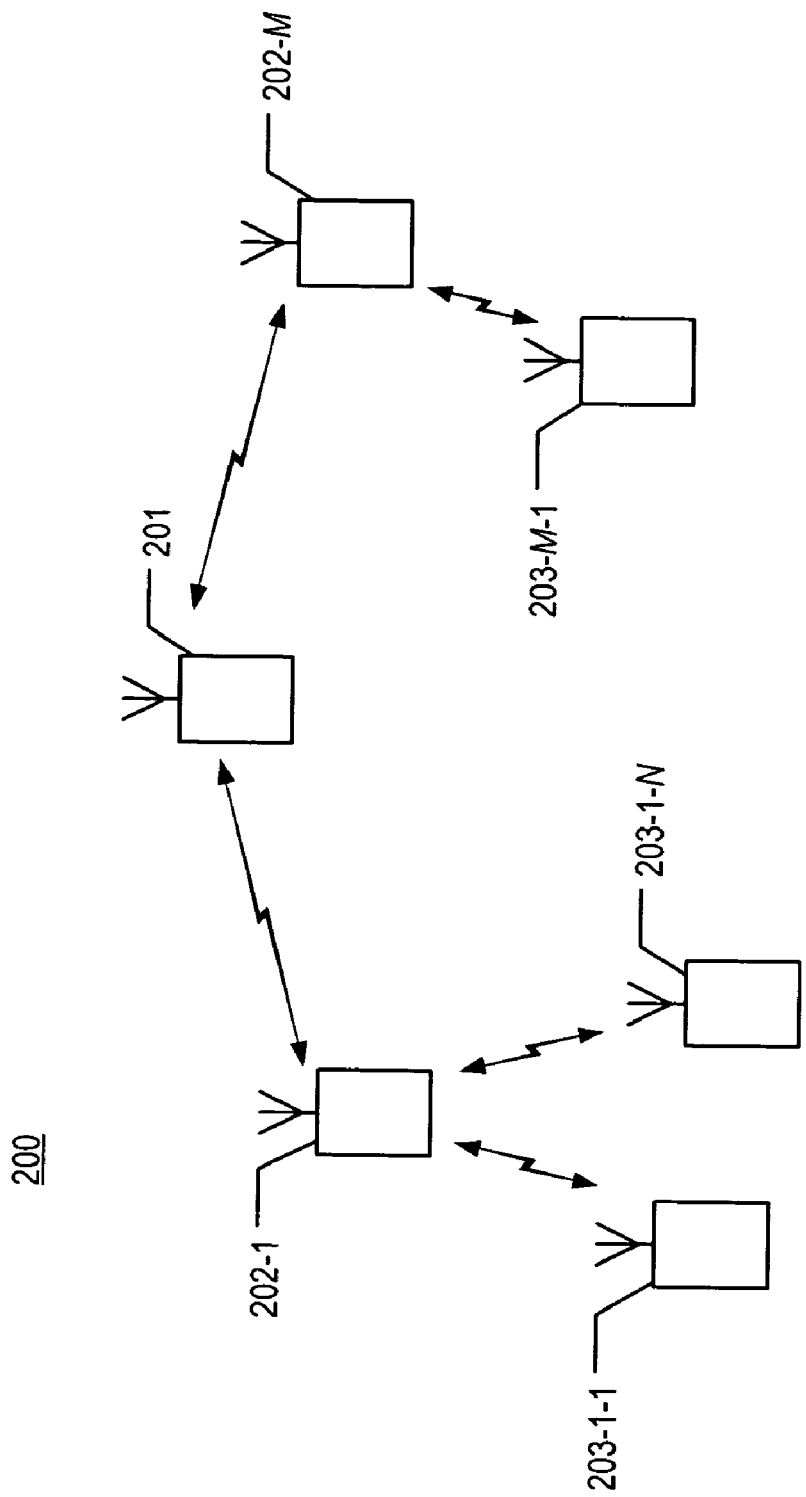
FIG. 2 depicts a schematic diagram of a portion of local area network 200 in accordance with the illustrative embodiment of the present invention.

FIG. 2 depicts a schematic diagram of a portion of local area network 200 in accordance with the illustrative embodiment of the present invention. Local area network 200 can be a wireless local network, operating in accordance with an air interface protocol such as IEEE 802.11. Local area network 200 comprises access point 201, primary stations 202-$i$, for i=1 to M, and secondary stations 203-$i$-$j$, for i=1 to M and j=1 to N. M and N are positive integers. A scenario corresponding to values for M and N that are equal to 2 is depicted in the illustrative embodiment, although M and N can assume other values and there can be a different number of secondary stations 203-$i$-$j$ associated with each primary station 202-$i$.

Access point 201 communicates directly with primary stations 202-1 through 202-M. Primary station 202-$i$ communicates directly with secondary station 203-$i$-$j$. In accordance with the illustrative embodiment of the present invention, access point 201 can communicate with secondary station 203-$i$-$j$ through primary station 202-$i$. Access point 201 can also serve as a bridge to the rest of an extended network, such as an extended service set or another network not depicted in FIG. 2. It will be clear to those skilled in the art how to make and use access point 201.

Primary station 202-1 and primary station 202-M can communicate with each other indirectly through access point 201 because access point 201 and primary stations 202-1 through 202-M are associated with a specific grouping referred to as an "infrastructure basic service set." Frames that are exchanged between primary station 202-$i$ and access point 201 comprise a basic service set identifier that identifies the specific infrastructure basic service set in well-known fashion. It will be clear to those skilled in the art how to create an infrastructure basic service set.

Primary station 202-$i$ and secondary stations 203-$i$-$j$, for a given value of i, are associated with a specific grouping referred to as an "independent basic service set." Frames that are exchanged between primary station 202-$i$ and secondary stations 203-$i$-$j$, for a given value of i, comprise a basic service set identifier that identifies the specific independent basic service set in well-known fashion. It will be clear to those skilled in the art how to create an independent basic service set.

Figure 3:
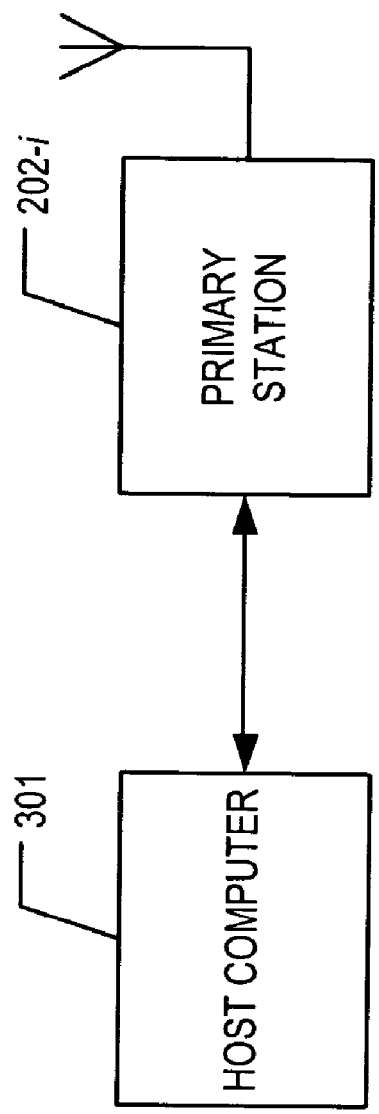
FIG. 3 depicts host computer 301 and primary station 202-*i* in accordance with the illustrative embodiment of the present invention.

FIG. 3 depicts a block diagram of the salient components of host computer 301 and primary station 202-$i$ in accordance with the illustrative embodiment of the present invention. Host computer 301, the "primary computer" in the illustrative embodiment, is capable of generating data messages and transmitting those data messages to primary station 202-$i$. Host computer 301 is also capable of receiving data messages from primary station 202-$i$ and of processing and using the data contained within those data messages. Host computer 301 can be, for example, a desktop or a laptop computer. It will be clear to those skilled in the art, after reading this specification, how to make and use host computer 301.

Primary station 202-$i$ is capable of receiving data messages from host computer 301 and transmitting over a shared communications channel data frames comprising the data received from host computer 301. Primary station 202-$i$ is also capable of receiving data frames from the shared communications channel and sending to host computer 301 data messages comprising data from the data frames. It will be clear to those skilled in the art, after reading this specification, how to make and use primary station 202-$i$.

Secondary station 203-$i$-$j$ is capable of receiving data messages from an associated application (i.e., running on a "secondary computer") and transmitting over the shared communications channel data frames comprising the data received from the associated application. The associated application can be, for example, a calendar program running on a personal digital assistant (PDA) or another low power device, possibly belonging to the user of host computer 301. Secondary station 203-$i$-$j$ is also capable of receiving data frames from the shared communications channel and sending messages comprising data from the data frames to an associated application. It will be clear to those skilled in the art how to make and use secondary station 203-$i$-$j$.

The connection between secondary station 203-$i$-$j$ and primary station 202-$i$ can be secured without requiring a complex user setup. For example, as part of establishing link layer security over the local connection, the user of a primary computer and a secondary computer served by primary station 202-$i$ and secondary station 203-$i$-$j$, respectively, can select a key to be used for link encryption and can enter the key into the primary computer and the secondary computer. The actual encryption is then performed in well-known fashion. Key distribution and maintenance are relatively straightforward, since typically a single individual uses a given primary station and the associated secondary station or stations, requiring that only one individual, or a limited number of individuals, has possession of a given key.

Figure 4:
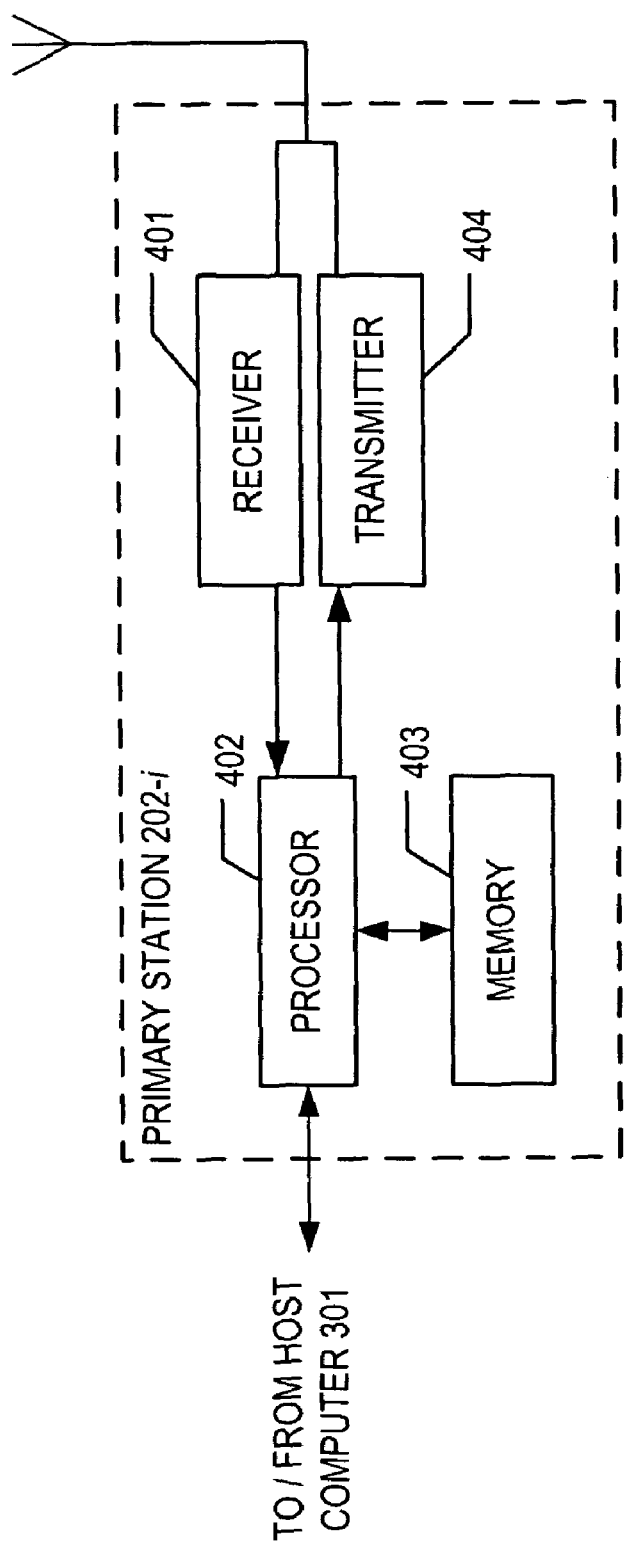
FIG. 4 depicts a block diagram of the salient components of primary station 202-*i* in accordance with the illustrative embodiment of the present invention.

FIG. 4 depicts a block diagram of the salient components of primary station 202-$i$ in accordance with the illustrative embodiment of the present invention. Primary station 202-$i$ comprises receiver 401, processor 402, memory 403, and transmitter 404, interconnected as shown.

Receiver 401 is a circuit that is capable of receiving frames from the shared communications channel, in well-known fashion, and of forwarding them to processor 402. It will be clear to those skilled in the art how to make and use receiver 401.

Processor 402 is a general-purpose processor that is capable of performing the tasks described below and with respect to FIGS. 5 through 8. It will be clear to those skilled in the art, after reading this specification, how to make and use processor 402.

Memory 403 is capable of storing programs and data used by processor 402. It will be clear to those skilled in the art how to make and use memory 403.

Transmitter 404 is a circuit that is capable of receiving frames from processor 402, in well-known fashion, and of transmitting them on the shared communications channel. It will be clear to those skilled in the art how to make and use transmitter 404.

Figure 5:
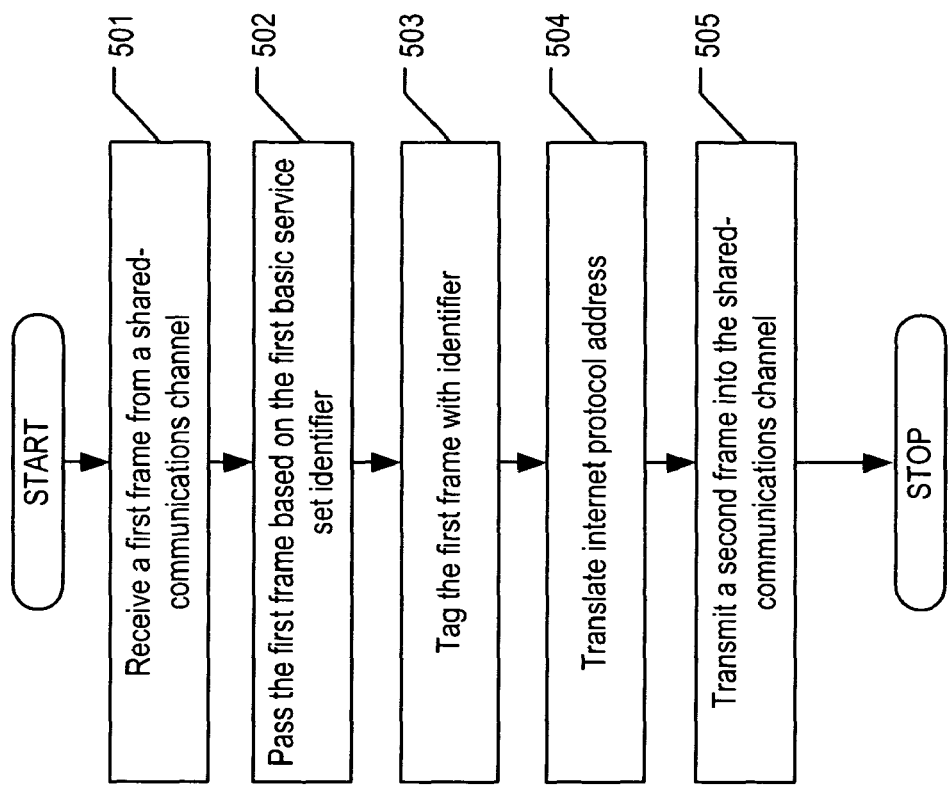
FIG. 5 depicts a flowchart of the illustrative embodiment of the present invention.

FIG. 5 depicts a flowchart of the salient tasks performed by the illustrative embodiment of the present invention. It will be clear to those skilled in the art which tasks depicted in FIG. 5 can be performed simultaneously or in a different order than that depicted.

At task 501, primary station 202-$i$ receives a first frame from the shared communications channel. The first frame comprises a first basic service set identifier and a pair of internet protocol addresses (i.e., source and destination addresses), and can also comprise a user data block. A user data block comprises data exchanged between applications (e.g., calendar data stored in a personal digital assistant versus master calendar data stored in a database server, etc.).

At task 502, primary station 202-*i* passes the frame along for additional processing after checking the value of the basic service set identifier. In some embodiments, values that constitute a pass condition include a value corresponding to the independent basic service set and a value corresponding to the infrastructure basic service set.

At task 503, primary station 202-*i* tags the contents of the first frame with a tag that is representative of the basic service set identifier. In some embodiments, tagging is performed at the medium access control (MAC) service access point (SAP) Tagging is necessary when the frame header has been stripped away by the medium access control function of primary station 202-*i*, leaving only the frame body. In some embodiments, tagging is not needed. It will be clear to those skilled in the art to determine when tagging is needed.

At task 504, primary station 202-*i* translates one of the internet protocol addresses in the received frame into a different internet protocol address. If primary station 202-*i* receives the frame from secondary station 203-*i*-*j*, the source internet protocol address gets translated. If primary station 202-*i* receives the frame from access point 201, the destination internet protocol address gets translated. This can be accomplished through a technique such as network address translation (NAT) in well-known fashion. In this way, access point 201 and extended network elements "see" primary station 202-*i*, even if the exchange of frames involves secondary station 203-*i*-*j* as one of the endpoints.

In some embodiments, host computer 301, instead of primary station 202-*i*, translates the internet protocol address. Host computer 301 uses the tag generated at task 503 to determine if the frame has been received from the independent basic service set or from the infrastructure basic service set.

At task 505, primary station 202-*i* transmits a second frame into the shared communications channel. The second frame comprises a second basic service set identifier and the translated internet protocol address, and can comprise the same user data block as that which was received earlier.

Figure 6:
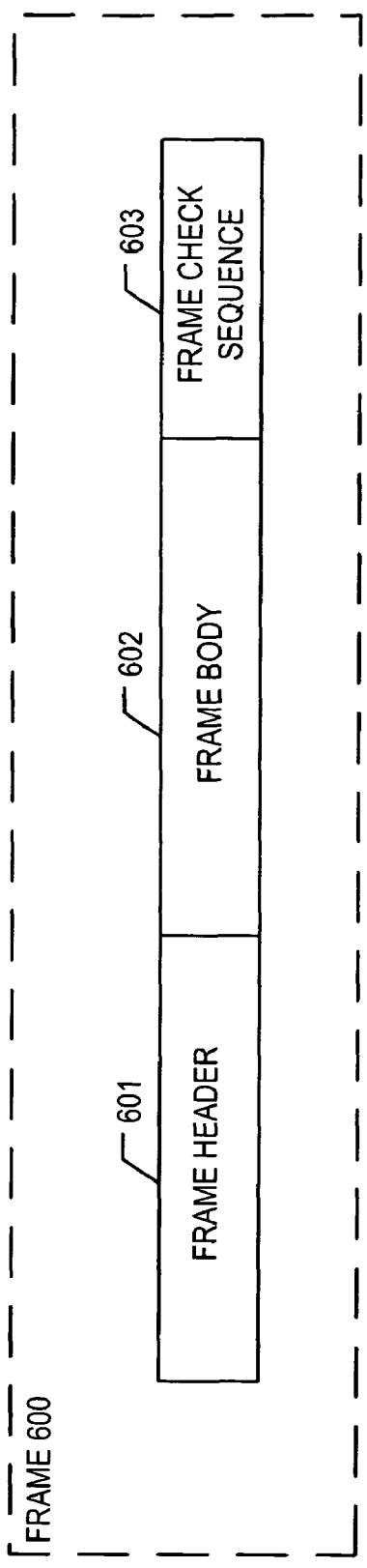
FIG. 6 depicts a schematic diagram of frame 600 in accordance with the illustrative embodiment of the present invention.

FIG. 6 depicts a block diagram of frame 600 in accordance with the illustrative embodiment of the present invention. Frame 600 comprises frame header 601, frame body 602, and frame check sequence 603, in well-known fashion. Frame header 601 comprises the basic service set identifier.

Figure 7:
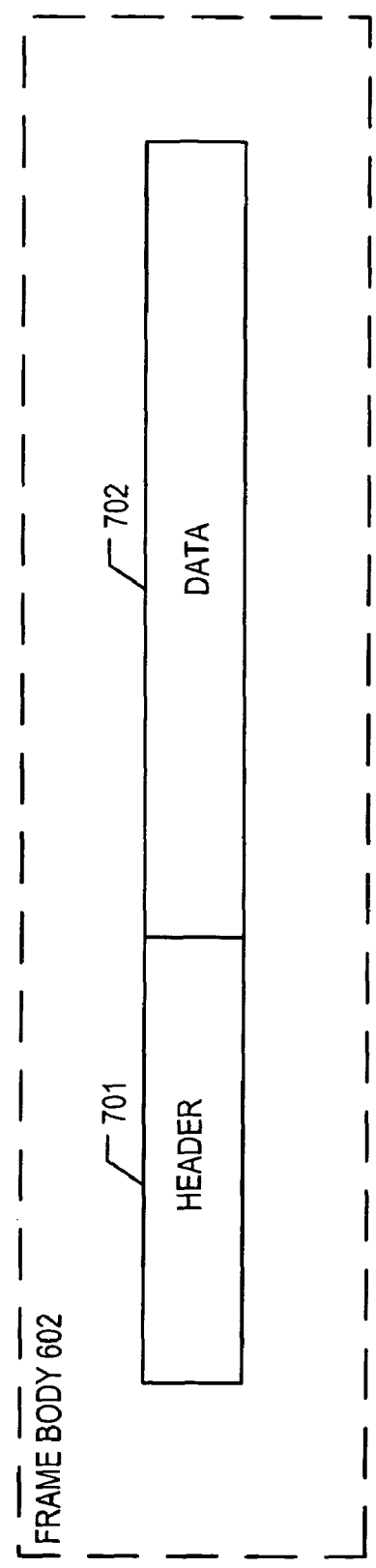
FIG. 7 depicts a schematic diagram of a frame body 602.

FIG. 7 depicts a block diagram of frame body 602. The frame body comprises header 701 and data 702, in well-known fashion. Header 701 comprises an internet protocol address of the source entity and an internet protocol address of the destination entity. Data 702 comprises a user data block.

Figure 8:
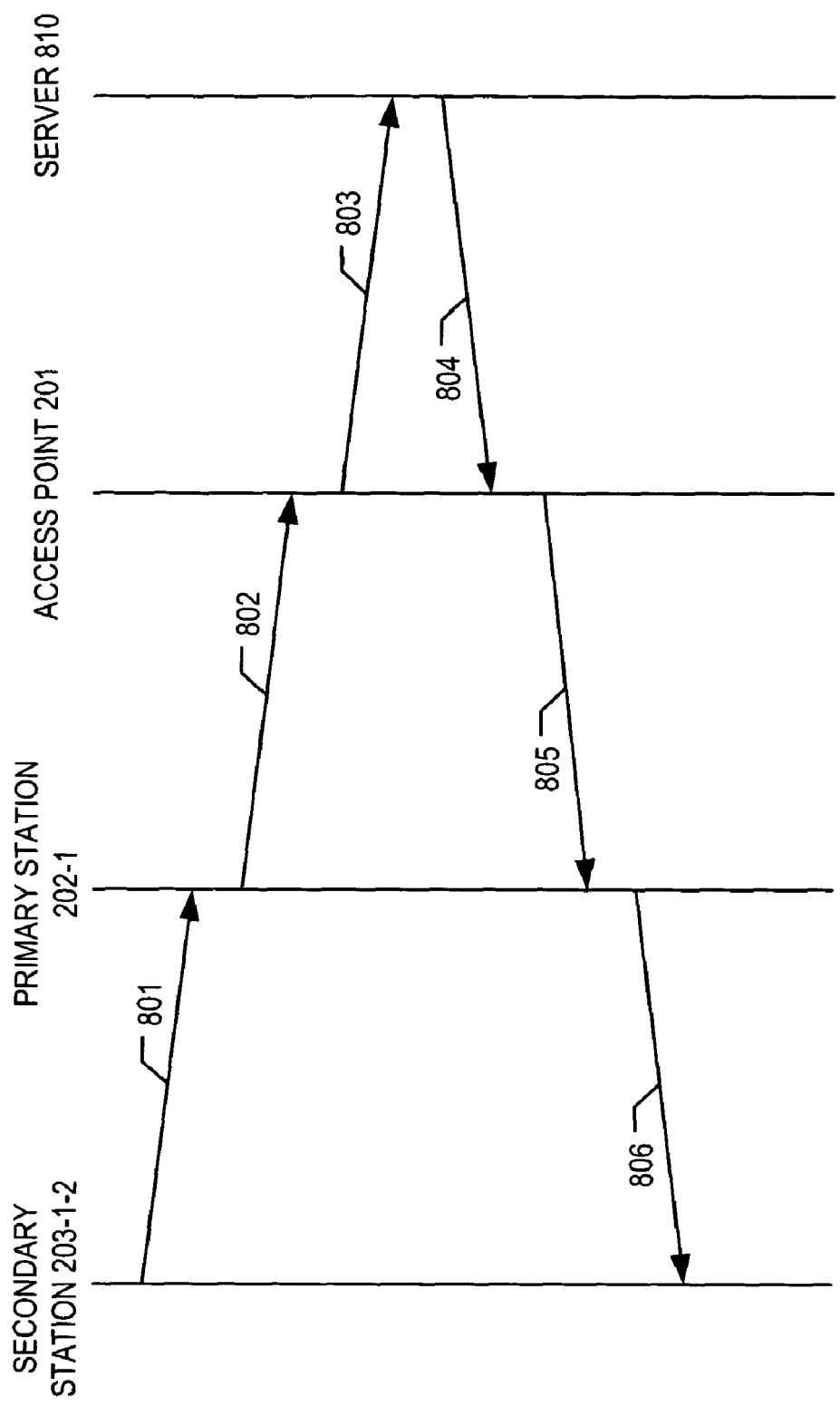
FIG. 8 depicts a message flow diagram in accordance with the illustrative embodiment of the present invention.

FIG. 8 depicts a message flow diagram in accordance with the illustrative embodiment of the present invention. For example, secondary station 203-1-2 (e.g., the station serving a personal digital assistant, etc.) wishes to retrieve information (e.g., an updated phone number, etc.) from a server in the extended network, depicted as server 810, that is accessible only through access point 201. Secondary station 203-1-2 forms frame 801 comprising an application request that server 810 can understand. Secondary station 203-1-2 then transmits frame 801 into the shared-communications channel to primary station 202-1. Frame 801 comprises the basic service set identifier that identifies the independent basic service set with which primary station 202-1 and secondary station 203-1-2 are associated, the internet protocol address of secondary station 203-1-2 as the source address, the internet protocol address of server 810 as the destination address, and the application request as part of a user data block. The source internet protocol address was previously provided to secondary station 203-1-2 by primary station 202-1 in well known fashion (e.g., through dynamic host configuration protocol [DHCP], etc.).

Primary station 202-1 forms frame 802 comprising the same application request that constituted the frame body in frame 801. Primary station 202-1 then transmits frame 802 into the shared-communications channel to access point 201. Frame 802 comprises the basic service set identifier that identifies the infrastructure basic service set with which primary station 202-1 and access point 201 are associated; the internet protocol address of primary station 202-1 as the source address, the source address having been translated by primary station 202-1; the internet protocol address of server 810 as the destination address; and the application request. Primary station 202-1 essentially performs a routing function.

Access point 201 then forwards the application request to server 810 via message 803 in well-known fashion. Server 810 subsequently transmits an application response to access point 201 via message 804 in well-known fashion.

Access point 201 forms frame 805 comprising the application response. Access point 201 then transmits frame 805 into the shared-communications channel to primary station 202-1. Frame 805 comprises the basic service set identifier that identifies the infrastructure basic service set with which primary station 202-1 and access point 201 are associated, the internet protocol address of primary station 202-1 as the destination address, and the application response as part of a user data block.

Primary station 202-1 forms frame 806 comprising the application response. Primary station 202-1 then transmits frame 806 into the shared-communications channel to secondary station 203-1-2. Frame 806 comprises the basic service set identifier that identifies the independent basic service set with which primary station 202-1 and secondary station 203-1-2 are associated; the internet protocol address of server 810 as the source address; the internet protocol address of secondary station as the destination address, the destination address having been translated by primary station 202-1; and the application response. Primary station 202-1 essentially performs a routing function.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
    receiving a first frame at a first wireless station from a shared-communications channel, the first frame comprising:
        a first basic service set identifier;
        a first internet protocol address; and
        a second internet protocol address;
    determining, at said first wireless station, whether to process said first frame based at least in part on said first basic service set identifier;
    tagging, at said first wireless station, said first frame with a tag that represents said first basic service set identifier; and
    transmitting, from said first wireless station, a second frame into said shared-communications channel, the second frame comprising:

a second basic service set identifier that is different from said first basic service set identifier;
a third internet protocol address that is different from said first internet protocol address; and
said second internet protocol address.

2. The method of claim 1, wherein said first internet protocol address is a source address indicating a source of the first frame, and the second internet protocol address is a destination address indicating an ultimate destination of the first frame.

3. The method of claim 1, wherein said second internet protocol address is a source address indicating an initial source of the first frame, and the first internet protocol address is a destination address indicating a destination of the first frame.

4. The method of claim 1, wherein the first basic service set identifier identifies an infrastructure basic service set, and said second basic service set identifier identifies an independent basic service set.

5. The method of claim 1, wherein the second basic service set identifier identifies an infrastructure basic service set, and said first basic service set identifier identifies an independent basic service set.

6. The method of claim 1, further comprising the first wireless station assigning the first internet protocol address to a secondary wireless station, and wherein the first frame is received at the first wireless station from said secondary wireless station.

7. The method of claim 1, wherein said first frame further comprises a first frame body, and the second frame further comprises a second frame body including at least a portion of the first frame body.

8. The method of claim 1, wherein said second frame is transmitted to an access point associated with the second basic service set identifier.

9. An apparatus comprising:
a receiver configured to receive a first frame from a shared-communications channel, the first frame comprising:
a first basic service set identifier;
a first internet protocol address; and
a second internet protocol address;
a processor configured to:
determine whether to process said first frame based at least in part on said first basic service set identifier; and
tag said first frame with a tag that represents said first basic service set identifier; and
a transmitter configured to transmit a second frame into said shared-communications channel, the second frame comprising:
a second basic service set identifier that is different from said first basic service set identifier;
a third internet protocol address that is different from said first internet protocol address; and
said second internet protocol address.

10. The apparatus of claim 9, wherein said first internet protocol address is a source address indicating a source of the first frame, and the second internet protocol address is a destination address indicating an ultimate destination of the first frame.

11. The apparatus of claim 9, wherein said second internet protocol address is a source address indicating an initial source of the first frame, and the first internet protocol address is a destination address indicating a destination of the first frame.

12. The apparatus of claim 9, wherein the first basic service set identifier identifies an infrastructure basic service set, and said second basic service set identifier identifies an independent basic service set.

13. The apparatus of claim 9, wherein the second basic service set identifier identifies an infrastructure basic service set, and said first basic service set identifier identifies an independent basic service set.

14. The apparatus of claim 9, wherein the processor is further configured to assign the first internet protocol address to a secondary wireless station, and wherein the first frame is received from said secondary wireless station.

15. The apparatus of claim 9, wherein said first frame further comprises a first frame body, and the second frame further comprises a second frame body including at least a portion of the first frame body.

16. The apparatus of claim 9, wherein said second frame is transmitted to an access point associated with the second basic service set identifier.

17. An apparatus comprising:
means for receiving a first frame at a first wireless station from a shared-communications channel, the first frame comprising:
a first basic service set identifier;
a first internet protocol address; and
a second internet protocol address;
means for determining, at said first wireless station, whether to process said first frame based at least in part on said first basic service set identifier;
means for tagging, at said first wireless station, said first frame with a tag that represents said first basic service set identifier; and
means for transmitting, from said first wireless station, a second frame into said shared-communications channel, the second frame comprising:
a second basic service set identifier that is different from said first basic service set identifier;
a third internet protocol address that is different from said first internet protocol address; and
said second internet protocol address.

18. The apparatus of claim 17, wherein said first internet protocol address is a source address indicating a source of the first frame, and the second internet protocol address is a destination address indicating an ultimate destination of the first frame.

19. The apparatus of claim 17, wherein said second internet protocol address is a source address indicating an initial source of the first frame, and the first internet protocol address is a destination address indicating a destination of the first frame.

20. The apparatus of claim 17, wherein the first basic service set identifier identifies an infrastructure basic service set, and said second basic service set identifier identifies an independent basic service set.

21. The apparatus of claim 17, wherein the second basic service set identifier identifies an infrastructure basic service set, and said first basic service set identifier identifies an independent basic service set.

22. The apparatus of claim 17, wherein said first frame further comprises a first frame body, and the second frame further comprises a second frame body including at least a portion of the first frame body.

23. The apparatus of claim 17, wherein said second frame is transmitted to an access point associated with the second basic service set identifier.

* * * * *

UNITED STATES PATENT AND TRADEMARK OFFICE
CERTIFICATE OF CORRECTION

PATENT NO. : 8,036,218 B2  
APPLICATION NO. : 12/172765  
DATED : October 11, 2011  
INVENTOR(S) : Godfrey et al.

Page 1 of 4

It is certified that error appears in the above-identified patent and that said Letters Patent is hereby corrected as shown below:

Column 6-7, lines 52-67 (Col. 6), 1-5 (Col. 7), in Claim 1, delete
"1. A method comprising:
receiving a first frame at a first wireless station from a shared-communications channel, the first frame comprising:
a first basic service set identifier;
a first internet protocol address; and a second internet protocol address;
determining, at said first wireless station, whether to process said first frame based at least in part on said first basic service set identifier;
tagging, at said first wireless station, said first frame with a tag that represents said first basic service set identifier; and
transmitting, from said first wireless station, a second frame into said shared-communications channel, the second frame comprising:
a second basic service set identifier that is different from said first basic service set identifier;
a third internet protocol address that is different from said first internet protocol address; and
said second internet protocol address." and insert
-- 1. A method comprising:
receiving a first frame at a first device, wherein the first frame includes a first basic service set identifier, and wherein the first frame is received from a second device;
tagging, at said first device, said first frame with a tag that represents said first basic service set identifier; and
transmitting, from said first device, a second frame to a third device in response to the first frame, wherein the second frame includes the tag and a second basic service set identifier, wherein the second basic service set identifier is different than the first basic service set identifier. --.

Column 7, line 6, in Claim 2, delete "claim 1, wherein" and
insert -- claim 1, wherein the first frame also includes a first internet protocol address and a second internet protocol address, and wherein --.

Signed and Sealed this  
Seventh Day of August, 2012

David J. Kappos  
*Director of the United States Patent and Trademark Office*

CERTIFICATE OF CORRECTION (continued)
U.S. Pat. No. 8,036,218 B2

Column 7, line 11, in Claim 3, delete "claim 1, wherein" and insert -- claim 1, wherein the first frame also includes a first internet protocol address and a second internet protocol address, and wherein --.

Column 7, lines 25-29, in Claim 6, delete
"6. The method of claim 1, further comprising the first wireless station assigning the first internet protocol address to a secondary wireless station, and wherein the first frame is received at the first wireless station from said secondary wireless station." and insert
-- 6. The method of claim 1, wherein the first frame also includes a first internet protocol address, and further comprising assigning the first internet protocol address to the second device. --.

Column 7, lines 35-36, in Claim 8, delete "wherein said second frame is transmitted to an access point" and insert -- wherein the third device is an access point --.

Column 7, lines 38-57, in Claim 9, delete
"9. An apparatus comprising:
a receiver configured to receive a first frame from a shared-communications channel, the first frame comprising:
a first basic service set identifier;
a first internet protocol address; and
a second internet protocol address;
a processor configured to:
determine whether to process said first frame based at least in part on said first basic service set identifier; and
tag said first frame with a tag that represents said first basic service set identifier; and
a transmitter configured to transmit a second frame into said shared-communications channel, the second frame comprising:
a second basic service set identifier that is different from said first basic service set identifier;
a third internet protocol address that is different from said first internet protocol address; and
said second internet protocol address." and insert
-- 9. An apparatus comprising:
a receiver configured to receive a first frame via a shared-communications channel, wherein the first frame includes a first basic service set identifier, and wherein the first frame is received from a first device;
a processor configured to:
tag said first frame with a tag that represents said first basic service set identifier; and
a transmitter configured to transmit a second frame to a second device in response to the first frame, wherein the second frame includes the tag and a second basic service set identifier, wherein the second basic service set identifier is different than the first basic service set identifier. --.

Column 7, line 58, in Claim 10, delete "claim 9, wherein" and insert -- claim 9, wherein the first frame also includes a first internet protocol address and a second internet protocol address, and wherein --.

Column 7, line 63, in Claim 11, delete "claim 9, wherein" and insert -- claim 9, wherein the first frame

CERTIFICATE OF CORRECTION (continued)
U.S. Pat. No. 8,036,218 B2 also includes a first internet protocol address and a second internet protocol address, and wherein --.

Column 8, lines 9-12, in Claim 14, delete
"14. The apparatus of claim 9, wherein the processor is further configured to assign the first internet protocol address to a secondary wireless station, and wherein the first frame is received from said secondary wireless station." and insert
-- 14. The apparatus of claim 9, wherein the first frame also includes a first internet protocol address, and wherein the processor is further configured to assign the first internet protocol address to the first device. --.

Column 8, lines 17-18, in Claim 16, delete "wherein said second frame is transmitted to an access point" and insert -- wherein said second device is an access point --.

Column 8, lines 20-40, in Claim 17, delete
"17. An apparatus comprising:
means for receiving a first frame at a first wireless station from a shared-communications channel, the first frame comprising:
a first basic service set identifier;
a first internet protocol address; and
a second internet protocol address;
means for determining, at said first wireless station, whether to process said first frame based at least in part on said first basic service set identifier;
means for tagging, at said first wireless station, said first frame with a tag that represents said first basic service set identifier; and
means for transmitting, from said first wireless station, a second frame into said shared-communications channel, the second frame comprising:
a second basic service set identifier that is different from said first basic service set identifier;
a third internet protocol address that is different from said first internet protocol address; and
said second internet protocol address." and insert
-- 17. An apparatus comprising:
means for receiving a first frame via a shared-communications channel, wherein the first frame includes a first basic service set identifier, and wherein the first frame is received from a first device;
means for tagging said first frame with a tag that represents said first basic service set identifier; and
means for transmitting a second frame to a second device in response to the first frame, wherein the second frame includes the tag and a second basic service set identifier, and wherein the second basic service set identifier is different than the first basic service set identifier. --.

Column 8, line 41, in Claim 18, delete "claim 17, wherein" and insert -- claim 17, wherein the first frame also includes a first internet protocol address and a second internet protocol address, and wherein --.

Column 8, line 46, in Claim 19, delete "claim 17, wherein" and insert -- claim 17, wherein the first frame also includes a first internet protocol address and a second internet protocol address, and wherein --.

Column 8, lines 63-64, in Claim 23, delete "second frame is transmitted to an access point" and insert -- second device is an access point --.